US011763657B2

(12) United States Patent
Bistany et al.

(10) Patent No.: US 11,763,657 B2
(45) Date of Patent: *Sep. 19, 2023

(54) SYSTEM AND METHOD FOR DETECTION OF VAPORIZED AEROSOLS

(71) Applicant: Zeptive, Inc., Burlington, MA (US)

(72) Inventors: Loucinda C. Bistany, Burlington, MA (US); William D. Hargett, Burlington, MA (US); Stephen S. Milt, Burlington, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/505,581

(22) Filed: Oct. 19, 2021

(65) Prior Publication Data

US 2022/0044542 A1 Feb. 10, 2022

Related U.S. Application Data

(63) Continuation of application No. 17/001,994, filed on Aug. 25, 2020, now Pat. No. 11,195,406.

(60) Provisional application No. 62/929,888, filed on Nov. 3, 2019.

(51) Int. Cl.
| | |
|---|---|
| *G08B 21/00* | (2006.01) |
| *G08B 21/12* | (2006.01) |
| *G01K 13/00* | (2021.01) |
| *G01P 13/00* | (2006.01) |
| *G08B 3/10* | (2006.01) |
| *G01D 21/02* | (2006.01) |
| *G08B 21/18* | (2006.01) |
| *G01N 15/06* | (2006.01) |

(52) U.S. Cl.
CPC .......... *G08B 21/12* (2013.01); *G01D 21/02* (2013.01); *G01K 13/00* (2013.01); *G01N 15/06* (2013.01); *G01P 13/00* (2013.01); *G08B 3/10* (2013.01); *G08B 21/182* (2013.01)

(58) Field of Classification Search
CPC ........ G08B 21/12; G08B 3/10; G08B 21/182; G08B 21/22; G01D 21/02; G01K 13/00; G01N 15/06; G01N 2015/0046; G01N 2015/0693; G01P 13/00
USPC ......................................................... 340/627
See application file for complete search history.

(56) References Cited

U.S. PATENT DOCUMENTS

| | | | | |
|---|---|---|---|---|
| 6,115,651 A * | 9/2000 | Cruz | ................... | B60Q 1/52 |
| | | | | 701/28 |
| 10,982,873 B1 * | 4/2021 | Clark | .................. | F24F 11/64 |

* cited by examiner

*Primary Examiner* — Tai T Nguyen (57) ABSTRACT

A vaporized aerosol detection system is presented herein. The system can include a motion sensor that is configured to detect movement in a predetermined or desired area. Further, the motion sensor can be configured to generate a detection signal in response to one or more detected objects in the area. The system can also include a particle sensor electronically coupled to the motion sensor. The particle sensor can be configured to detect a particle count of the area when the objects are detected by the motion sensor. Further, the system can include a housing configured to enclose at least a portion of the motion sensor and particle sensor.

20 Claims, 6 Drawing Sheets

SYSTEM AND METHOD FOR DETECTION OF VAPORIZED AEROSOLS

CROSS-REFERENCE TO RELATED APPLICATIONS

This application is a continuation of U.S. patent application Ser. No. 17/001,994, now U.S. Pat. No. 11,195,406, filed on Aug. 25, 2020 and entitled "System and Method for Detection of Vaporized Aerosols" which in turn claims the benefit of priority to U.S. Provisional Patent Application Ser. No. 62/929,888 filed on Nov. 3, 2019 and entitled "Cloud Enabled Sensor". Each above-referenced application is incorporated by reference herein in its entirety.

FIELD OF INVENTION

The present invention generally relates to the field of detection of vaporized aerosols. In particular, the present invention is directed to a system and method of sensors and signals to detect particles in a vaporized aerosol and alert one or more users to its detection.

BACKGROUND

The proliferation of Electronic Nicotine Delivery Systems (ENDS) and Electronic Non-Nicotine Delivery Systems (ENNDS) requires the detection of the products of those systems in certain indoor areas and/or vehicles. Currently, some systems for the detection of vaporized aerosols are used in limited settings. Further these systems are limited by their power management and lack of adaptability.

SUMMARY OF DISCLOSURE

In an aspect, an air quality detection system. The system can comprise a motion sensor configured to detect a movement in an environment. Further, the system can include a sensor suite including a particle sensor configured to detect a particle count of the environment and a power controller configured to control power to the sensor suite. Additionally, the system may include a housing configured to enclose at least a portion of the motion sensor, the sensor suite, and the power controller. In response to the movement indicating an object has entered the environment, the power controller can change the particle sensor from a powered-off state to a powered-on state.

In another aspect, a method for air quality detection. The method can include detecting, by a motion sensor, a movement in an environment. Additionally, the method can include, in response to the movement indicating an object has entered the environment, changing a particle sensor from a powered-off state to a powered-on state. Further, the method can include detecting, by the particle sensor, a particle count of the environment when the particle sensor is in a powered-on state. At least a portion of the motion sensor and at least a portion of the particle sensor can be disposed in a housing.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

Figure 1:
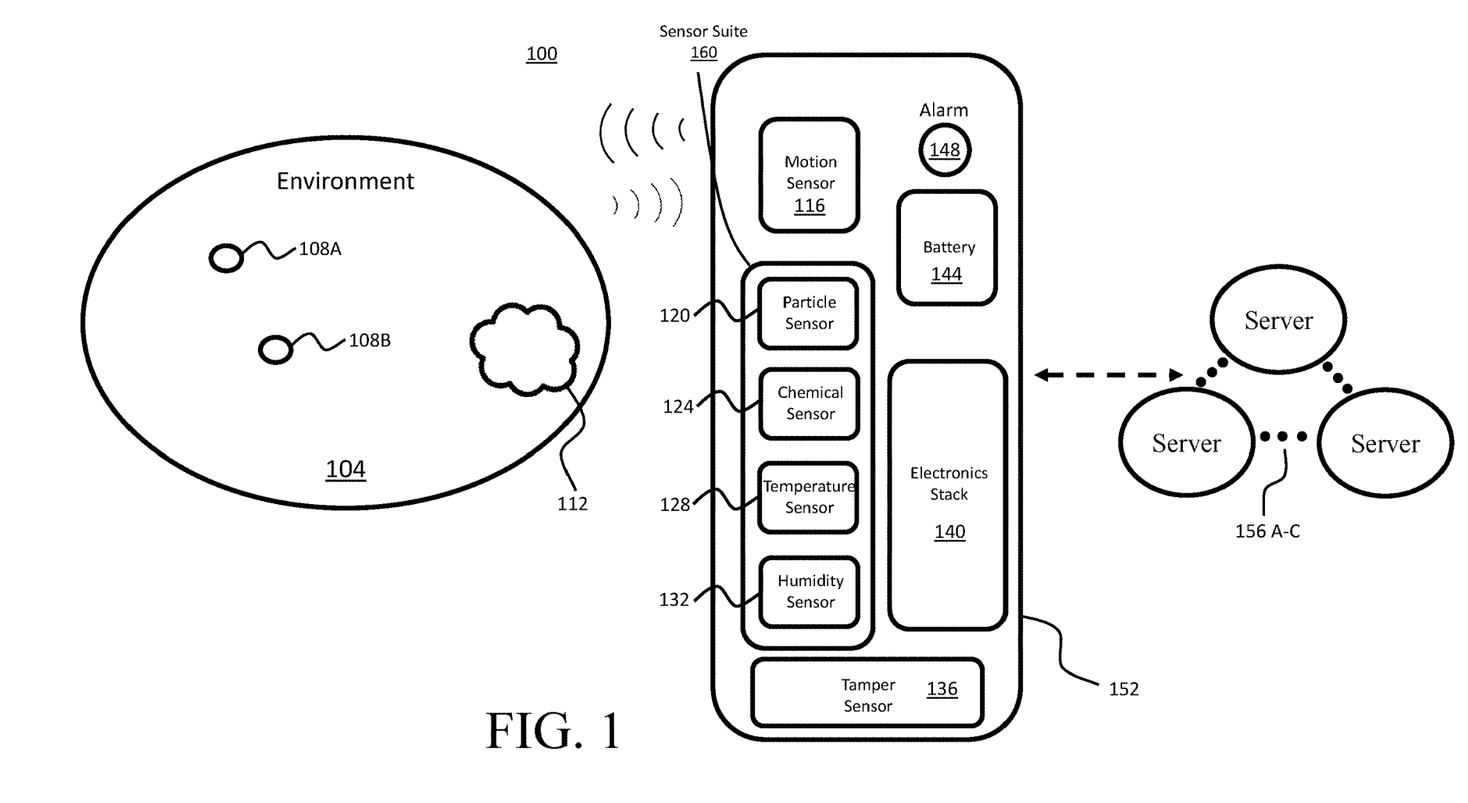
FIG. 1 is a block diagram illustrating a vaporized aerosol detection system, according to embodiments.

At a high level, with reference to FIG. 1, a system of sensors and components to detect particles in a vaporized aerosol is provided. The system comprises a device disposed in an environment where a substance such as a vaporized aerosol containing chemical particles may be present and may be connected to at least one of a plurality of servers. In an aspect, a housing may encapsulate at least a portion of the system components. The housing may be disposed in an environment having a vaporized aerosol present. Particles may be present and have a microscopic or macroscopic size, a distribution, and a count. Devices of the system may enter a low power consumption mode to extend component and battery life.

Referring now to FIG. 1, vaporized aerosol detection system 100 is configured to detect substances 112 within environment 104 and generate an alarm based on the detected particles. Substances 112 may comprise aerosolized particles, substances of interest (such as smoke from tobacco, smoke from drug use, or the like), gasses, gaseous clouds, gaseous chemicals, biologicals (such as viruses, bacteria, pathogens, or the like) or any combination thereof. Further, vaporized aerosol detection system 100 can be configured to transmit and store a signal indicating an alarm and/or data relating to the detected particles to at least one server of a plurality of servers 156 A-C. Any and all signals generated by vaporized aerosol detection system 100 may be additionally or alternatively stored onboard in a memory (discussed below) or remotely on servers 156 A-C.

According to embodiments, vaporized aerosol detection system 100 can include motion sensor 116, sensor suite 160 (including particle sensor 120, chemical sensor 124, temperature sensor 128, humidity sensor 132, or any combination thereof), alarm 148, battery 144, electronics stack 140, tamper sensor 136, housing 152, or any combination thereof.

In embodiments, motion sensor 116 comprises one or more sensors each configured to detect motion, proximity, and/or presence and is configured to detect the motion, proximity, and/or presence of one or more objects 108 A, B within environment 104. For example, motion sensor 116 may include light sensors (such as infrared sensors, passive infrared sensors, area reflective type sensors, etc.), microwave sensors, ultrasound sensors, vibration sensors, dual technology sensors, or any combination thereof, to name a few. Objects 108 A, B can include people, animals, vehicles, inanimate objects, or any combination thereof, to name a few examples. For example, motion sensor 116 can be configured to detect the motion of a person in environment 104. According to embodiments, motion sensor 116 can be configured to detect when objects 108 A, B enter or leave environment 104 such as by observing the motion, proximity, and/or presence of objects 108 A, B.

According to embodiments, environment 104 can comprise an area of interest in which vaporized aerosols are prohibited or discouraged. For example, environment 104 can include areas of a school (such as classrooms, halls, bathrooms, school yards, gymnasiums, school buses, or any combination thereof, to name a few), rental vehicles (such as rental cars, moving trucks, rented recreational vehicles, etc.), business vehicles (such as company cars, vans, tractor-trailer trucks, etc.), rideshare vehicles, areas of an airplane, train, and/or bus (such as cockpits, cabins, bathrooms, or any combination thereof, to name a few), residences, rental homes, rental apartments, hotels (such as hotel rooms, hotel conference rooms, ballrooms, etc.), motel rooms, workplaces (such as offices, factories, warehouses, parking structures, or any combination thereof, to name a few), hospitals, correctional facilities, or any combination thereof.

In embodiments, when motion sensor 116 detects the motion, proximity, duration, speed, size, and/or presence of objects 108 A, B, motion sensor 116 may be configured to generate a detection signal. The detection signal can comprise an analog and/or digital signal indicating the motion, proximity, and/or presence of objects 108 A, B within environment 104. According to embodiments, motion signal 116 can be configured to generate the detection signal when it detects an object 108 A, B entering environment 104. In embodiments, the detection signal can indicate a time, size, speed, duration, and/or quantity of objects 108 A, B within and/or entering environment 104.

According to embodiments, motion sensor 116 can be electronically and/or communicatively coupled to electronics stack 140 and can be configured to provide the detection signal to electronics stack 140 when the detection signal is generated. Electronics stack 140 can comprise analog and/or digital circuitry configured to condition, analyze, and/or transform received signals. For example, electronics stack 140 can comprise a microprocessor, a microcontroller, a power microcontroller, a processor, an analog-to-digital converter, a digital-to analog converter, logic circuitry, a memory (e.g., flash memory, hard disk drive, solid state memory, random-access memory, programmable read-only memory, electronically erasable programmable read-only memory, or any combination thereof, to name a few), or any combination thereof, to name a few. According to embodiments, electronics stack 140 can be configured to store received signals from motion sensor 116 in a memory.

In embodiments, electronics stack 140 may be configured to determine if an object 108 A, B has entered environment 104 by analyzing the received detection signal. Analyzing the detection signal can include comparing a level of the detection signal to a movement threshold value, comparing a time indicated by the detection signal, a time threshold, comparing a duration indicated by the detection signal to a duration threshold, comparing a size indicated by the detection signal to a size threshold, or any combination thereof, to name a few.

According to embodiments, a user may set, adjust, cancel, or otherwise manipulate these threshold levels from a user device, whether those thresholds are stored within electronics stack 140 or remotely in servers 156 A-C.

In embodiments, electronics stack 140 can be electronically coupled to battery 144. Battery 144 can comprise one or more battery elements in parallel and/or series configured to provide power to motion sensor 116, sensor suite 160, alarm 148, electronics stack 140, tamper sensor 136, or any combination thereof. For example, battery 144 can comprise one or more lithium-ion batteries, alkaline batteries, lead-acid batteries, aluminum-ion batteries, flow batteries, magnesium-ion batteries, metal-air electrochemical cells, nickel-ion batteries, zinc-ion batteries, or any combination thereof, to name a few. According to embodiments, battery 144 can comprise an alternative power source such as an alternating current ("AC") power source, direct current ("DC") power source, power over ethernet (PoE), a solar photovoltaic cell, a wind turbine, or any combination thereof, and/or power electronics such as a half-bridge rectifier, full bridge rectifier, inverter, maximum-point power tracker, power converter (such as a buck converter, boost converter, buck-boost converter, flyback converter, transformer, etc.), or any combination thereof, to name a few. In embodiments, if battery 144 includes PoE, a DC power source, and/or an AC wall outlet power, operation of motion sensor 116, particle sensor 120, chemical sensor 124, temperature sensor 128, humidity sensor 132, tamper sensor 146, electronics stack 140, alarm 148, or any combination thereof may remain powered at all times.

According to embodiments, battery 144 is configured to provide power to at least a portion of sensor suite 160, alarm 148, electronics stack 140, and/or tamper sensor 136 based upon electronics stack 140. In embodiments, electronics stack 140 can comprise power management circuitry including, for example, a power microcontroller, switches, relays, transistors, linear regulators, power converters, or any combination thereof, to name a few. The power management circuitry of electronics stack 140 can be configured to provide power from battery 144 to at least a portion of sensor suite 160, alarm 148, and/or tamper sensor 136 based upon a received detection signal from motion sensor 116, or another sensor configured to act as a trigger for the power management circuitry, and in embodiments may comprise particle sensor 120, chemical sensor 124, and/or a real time clock configured to keep track of time. According to embodiments, electronics stack 140 can be configured to provide power from battery 144 to at least a portion of sensor suite 160, alarm 148, and/or tamper sensor 136 according to the size, duration, time, and/or quantity of detected objects 108 A, B indicated by a detection signal, according to a time the detection signal is received, or any combination thereof. For example, when the detection signal indicates that an object 108 A, B has entered environment 104, electronics stack 140 can be configured to provide power to particle sensor 120 such that particle sensor 120 is adequately powered to take measurements. As another example, electronics stacks 140 can be configured to provide power from battery 144 to sensor suite 160 when a detection signal indicating an object 108 A, B of a predetermined size has entered environment 104. Electronics stack 140 may also be configured to calibrate and/or trim any and all sensors that may be present within vaporized aerosol detection system 100 and/or coupled to the system remotely. Calibration of sensors and systems may comprise zeroing a sensor after a reading, power cycle, malfunction, or the like.

In embodiments, electronics stack 140 can be configured to monitor a power and/or battery level of battery 144 and generate a signal including data representing the current power and/or battery level of battery 144. The data representing the current power and/or battery level of battery 144 can represent the current, historical, or projected power and/or battery level of battery 144 and can be expressed as a percentage, a value (such as in amp hours), graphically, or any combination thereof. According to embodiments, electronics stack 140 can be configured to compare the data representing the current power and/or battery level of battery 144 to a predetermined low-battery threshold which may be stored in electronics stack 140 or servers 156 A-C. In embodiments, electronics stack 140 can be configured to generate a low-battery alert when the current power and/or battery level of battery 144 is equal to or less than the low-battery threshold value. The low-battery alert can comprise a signal including representing that battery 144 is at low power and may be configured to be displayed on a display or user device. In embodiments, the low-battery alert may comprise a signal configured to induce a change in a color of a display such as an LED. For example, the low-battery alert may be configured to switch an LED from green to red.

According to embodiments, electronics stack 140 can be configured to provide and/or transmit the signal including data representing the current power and/or battery level of battery 144 to servers 156 A-C. Servers 156 A-C can be configured to compare the data representing the current power and/or battery level of battery 144 to the predetermined low-battery threshold. In embodiments, servers 156 A-C can be configured to generate a low-battery alert when the current power and/or battery level of battery 144 is equal to or less than the low-battery threshold value.

According to embodiments, a user may set, adjust, cancel, or otherwise manipulate the low-battery threshold level from a user device, whether the low-battery threshold is stored within electronics stack 140 or remotely in servers 156 A-C.

In embodiments, when power is provided to sensor suite 160 from battery 144, sensor suite 160 can be configured to detect substances 112 in environment 104. Substances 112 can include one or more substances, gases, and/or particles that have been aerosolized in at least a portion of environment 104. For example, substances 112 can include chemical particles from a nicotine vaping device, a cannabinoid vaping device, a tetrahydrocannabinol vaping device, a chemical spill (such as dimethyl sulfate, toluene diisocyanate), hazardous gas clouds (such as arsine, dimethyl sulfate, toluene, hydrogen azide, hydrogen cyanide, nitrogen dioxide), animal excrement (such as ammonia), tobacco smoke, carbon dioxide, carbon monoxide, methamphetamine, fentanyl, anhydrous ammonia, or any combination thereof, to name a few. Sensor suite 160 can be configured to detect the quantity (i.e., particle count), density, size, structure, and/or dispersion of substances 112 and can include particle sensor 120, chemical sensor 124, temperature sensor 128, humidity sensor 132, or any combination thereof. In embodiments, sensor suite 160 may be electronically and/or communicatively coupled to electronics stack 140. Communicative coupling may comprise a connection sufficient to transfer data back and forth between sensor suite 160 and electronics stack 140. Communicative coupling may be a wired or wireless connection that may employ electronic buses, ethernet, internet, WiFi, Bluetooth, cellular network, or another undisclosed method alone or in combination. Additionally, or alternatively, sensor suite 160 may be communicatively coupled to at least a server 156 A-C. This communicative coupling, as disclosed, is a connection sufficient for transferring data between sensor suite 160 and at least a server 156 A-C and can include WiFi, ethernet, cellular networks, Bluetooth, NB-IoT, LTE CAT1, LTE-M1, CAT NB1, long-range (LoRA) communication connects, or any combination thereof, to name a few.

In an embodiment, sensor suite 160 may comprise particle sensor 120. Particle sensor 120 can comprise one or more sensors that are configured to detect a quantity (i.e., particle count), size, structure, dispersion, or any combination thereof, of substances 112. In embodiments, particle sensor 120 may be configured to differentiate ambient particles present in environment 104 to substances of interest that may trigger an alert within the system. For example, particle sensor 120 may be configured to compare a historical reading of particles in environment 104 to a detection of substances 112 to determine what particles within substances 112 are ambient in environment 104 and which particles may be substances of interest. According to embodiments, particle sensor 120 may be configured to measure or otherwise detect the quantity (i.e., particle count), size, structure, dispersion, or any combination thereof, of particles present in substances 112 and may be configured to translate those readings into electronic signals. According to embodiments, particle sensor 120 may be electronically and/or communicatively coupled to electronics stack 140 and can be configured to send signals including data representing the quantity (i.e., particle count), size, structure, dispersion, or any combination thereof, of particles present in substances 112 to electronics stack 140.

In embodiments, sensor suite 160 may include chemical sensor 124. Chemical sensor 124 can include one or more sensors configured to detect the structure, size, shape, and/or composition of particles in order to determine the chemical composition of substances 112 in environment 104. Chemical sensor 124 may comprise a printed electrochemical sensor, Complementary Metal Oxide Semiconductor (CMOS) circuit, metal oxide, nanotube, micro cantilever, micro hot plates, mobility spectrometer (ion or differential), mass spectrometer, infrared spectrometer, or any combination thereof, to name a few examples. In embodiments, chemical sensor 124 may be configured to differentiate ambient chemicals present in environment 104 to chemicals of interest that may trigger an alert within the system. For example, chemical sensor 124 may be configured to detect a plurality of chemicals and/or gaseous or aerosolized particles, some of which may include nicotine, cannabinoids, tetrahydrocannabinoids, particles from a chemical spill (such as dimethyl sulfate, toluene diisocyanate), particles in hazardous gas clouds (such as arsine, hydrogen azide, hydrogen cyanide, nitrogen dioxide), particles from animal excrement (such as ammonia), tobacco smoke, carbon dioxide, carbon monoxide, sulfur dioxide, ozone, nitrogen dioxide, respiratory irritants, indicators of indoor air quality, or any combination thereof. Chemical sensor 124 may translate readings it collects to an electronic signal including data representing the structure, size, shape, and/or composition of particles. In embodiments, chemical sensor 124 can be electronically and/or communicatively coupled to electronics stack 140 and can be configured to send the signals including data representing the structure, size, shape, and/or composition of particles to electronics stack 140.

According to embodiments, sensor suite 160 may comprise temperature sensor 128. Temperature sensor 128 can include one or more sensors configured to determine the temperature of environment 104. Temperature, for the purposes of this disclosure, is the amount of heat energy present in environment 104. One of ordinary skill in the art would appreciate that temperature is truly the amount of kinetic energy present in an environment on the atomic level, and for the purposes of this disclosure, temperature as it affects electronics, humans, objects, and/or gaseous elements may be measured in Fahrenheit, Celsius, Kelvin and/or the like. According to embodiments, temperature sensor 128 may determine a temperature of environment 104 to help assess the dispersion, density, and/or composition of substances 112 in environment 104. Additionally, temperature sensor 128 may determine the temperature of environment 104 to assess the health of the electronics and sensors present within vaporized aerosol detection system 100. In embodiments, temperature sensor 128 may be configured to generate a signal including data representing a detected temperature of environment 104 and provide this signal to electronics stack 140, at least a first server 156 A-C, or a combination thereof. In embodiments, this signal may also include data alerting a user of a change in temperature of environment 104 over or under certain thresholds or to alert a user of aerosolized particles evidenced by a change in temperature. According to embodiments, temperature sensor 128 may translate readings it collects into electronic signals including data representing the detected temperatures. Temperature sensor 128 can be electronically and/or communicatively coupled to electronics stack 140 and can be configured to provide such signals to electronics stack 140.

In embodiments, sensor suite 160 may comprise humidity sensor 132. Humidity sensor 132 can include one or more sensors configured to determine the amount of humidity present in environment 104. Humidity, for the purposes of this disclosure is the quantity of vaporized water in a gaseous area, in this case air of environment 104. Humidity sensor 132 may be further configured to measure humidity in one of three general methods: absolute, relative, and specific. Absolute humidity describes the water content of air and is expressed in either grams per cubic meter or grams per kilogram. Relative humidity may be expressed as a percentage and indicate a present state of absolute humidity relative to a maximum humidity given the same temperature (as determined by temperature sensor 128). Specific humidity is the ratio of water vapor mass to total moist air parcel mass. Humidity sensor 132 may be configured to determine humidity of environment 104 in order to detect a change in air density, which may be due to the presence of substances 112. Humidity sensor 132 may additionally or alternatively be configured to determine humidity of environment 104 in order to ascertain the optimal range of humidity for the complement of other sensors present in sensor suite 160, in an embodiment. Humidity sensor 132 may translate readings it collects into electronic signals including data representing the humidity in environment 104. In embodiments, humidity sensor 132 can be electronically and/or communicatively coupled to electronics stack 140 and can be configured to provide such signals to electronics stack 140.

According to embodiments, electronics stack 140 may comprise equipment necessary to receive signals generated from any disclosed or undisclosed sensor present within vaporized aerosol detection system 100. Electronics stack 140 can comprise analog and/or digital circuitry configured to condition, analyze, and/or transform received signals. For example, electronics stack 140 can comprise a microprocessor, a microcontroller, a power microcontroller, a processor, an analog-to-digital converter, a digital-to-analog converter, logic circuitry, or any combination thereof, to name a few.

In embodiments, electronics stack 140 may be configured to determine if substances of interest are present. Substances of interest can include any particles that may be a cause of concern for environment 104. For example, substances of interest can include substances that are disallowed in environment 104 (such as nicotine, cannabinoids, tetrahydrocannabinoids, tobacco smoke, etc.), substances that are hazardous (carbon monoxide, carbon dioxide, arsine, hydrogen azide, hydrogen cyanide, nitrogen dioxide, viruses, bacteria, pathogens, etc.), undesirable substances for environment 104 (tobacco smoke, nicotine, cannabinoids, tetrahydrocannabinoids, ammonia from pet excrement, etc.), or any combination thereof, to name a few. According to embodiments, determining whether substances of interest are present in environment 104 can include comparing levels of signals received from sensor suite 160 to various, predetermined threshold values. For example, electronics stack 140 may be configured to receive a signal including data representing a detected structure, size, shape, and/or composition of substances 112 and compare one or more levels included in this signal to predetermined threshold values in order to determine what chemicals (i.e., types of particles) are present in substances 112. According to embodiments, a user may set, adjust, cancel, or otherwise manipulate threshold levels from a user device, whether those thresholds are stored within electronics stack 140 or remotely in servers 156 A-C.

According to embodiments, these predetermined threshold values can include a level or measure of a detected structure, size, shape, and/or composition of substances 112. According to embodiments, these predetermined threshold values can be stored in a memory such as a memory of electronics stack 140.

In embodiments, electronics stack 140 and/or servers 156 A-C may be configured to determine if a detection event has occurred in environment 104. A detection event, for the purposes of this disclosure is the detection of substances, particles, or chemicals of interest in substances 112 within environment 104. For example, a detection event may indicate that a nicotine vaporizer device has been used in environment 104, a chemical spill has occurred in environment 104, smoke is present in environment 104, animal excrement is present in environment 104, or any combination thereof, to name a few examples. According to embodiments, a detection event can further indicate that a quantity, particle density, and/or dispersion of substances of interest within environment 104 have exceeded a predetermined threshold. For example, a detection event may indicate that the particle density of aerosolized vape has exceeded a threshold value in environment 104.

In embodiments, these predetermined threshold values may comprise a level or measure of a particle density, dispersion, and/or composition of particles that are disallowed, hazardous, or otherwise undesired in environment 104. According to embodiments, these predetermined threshold values can be stored in a memory such as a memory of electronics stack 140.

According to embodiments, electronics stack 140 may comprise equipment necessary for wireless transmission of electronic signals to a plurality of servers 156 A-C. Servers 156 can comprise one or more computers, servers, computing clouds, processors, microprocessors, a memory (e.g. flash memory, hard disk drive, solid state memory, random-access memory, programmable read-only memory, electronically erasable programmable read-only memory, or any combination thereof, to name a few), or any combination thereof. For example, electronics stack 140 may comprise a transceiver and can be configured to be communicatively coupled to a server 156 by a cellular phone network(s), wireless local area network (WLAN), wireless personal area networks (WPAN), wireless wide area networks (WWAN), wireless sensor networks, satellite communication networks, terrestrial microwave networks, Bluetooth, WiFi, ZigBee, low-power long range wide area network (LoRaWan and LoRa), internet, ethernet, a wireless ad-hoc network also known as a wireless mesh network, and/or any combination thereof. In embodiments, these predetermined threshold values may be stored within servers 156 A-C.

In embodiments, the processing of signals to determine detection events may be additionally or alternatively handled by remotely located servers 156 A-C. According to embodiments, servers 156 may be configured to determine what particles are present in environment 104 and whether a detection event has occurred by comparing levels of signals received from electronics stack 140 to various, predetermined threshold values. For example, servers 156 A-C may be configured to receive a signal including data representing a detected structure, size, shape, and/or composition of substances 112 and compare one or more levels included in this signal to predetermined threshold values in order to determine what chemicals (i.e., types of particles) are present in substances 112.

According to embodiments, electronics stack 140 may be configured to trigger an alert based on a detection event by electronics stack 140 or servers 156 A-C. In embodiments, when electronics stack 140 and/or servers 156 A-C have detected that a detection event has occurred, electronics stack 140 may then generate an alert signal and/or provide power to alarm 148 from battery 144. The alert signal may comprise an electrical signal configured to activate alarm 148. Alarm 148 can include an auditory alarm or signaling device (such as a buzzer, siren, horn, etc.), a visual alarm or signaling device (such as an LED, strobe light, laser, LED screen, LCD screen, etc.), tactile alarm or signalizing device (such as a vibration alarm, motor, etc.), or any combination thereof. Activating alarm 148 may include sending an electronic signal to alarm 148 to induce an audible alert (such as, for example, a chime, chirp, siren, beep, or otherwise artificial noise), a visual alert (such as, for example, flashing lights, a display, a strobe, color lights, etc.), a tactile alert (such as vibration, shaking, etc.), and/or any alert sufficient to alert that a detection event has occurred in environment 104. A user may adjust alarm volume, alarm sound, alarm light display, and disable alarm through user device and/or server 156 A-C.

In an embodiment, vaporized aerosol detection system 100 may also comprise tampering sensor 136. Tampering sensor 136 can include one or more sensors disposed within or on housing 152 and be configured to detect a tampering event. A tampering event can comprise someone breaking open vaporized aerosol detection system 100, someone moving vaporized aerosol detection system 100, someone touching vaporized aerosol detection system 100, someone hitting vaporized aerosol detection system 100, someone shaking vaporized aerosol detection system 100, someone disconnecting vaporized aerosol detection system 100, or any combination thereof. According to embodiments, tampering sensor 136 can be configured to detect a tampering event by detecting that an object in close proximity to vaporized aerosol detection system 100, movement of vaporized aerosol detection system 100, integrity of housing 152, or any combination thereof. For example, tampering sensor 136 can comprise one or more sensors configured to detect a tampering event when a person is attempting to move or break open vaporized aerosol detection system 100.

According to embodiments, tamper sensor 136 is configured to generate a tamper alarm when a tampering event is detected. A tamper alarm comprises an electronic signal configured to induce an audible alert, a visual alert, a tactile alert, and/or any alert sufficient to alert that a tamper event from alarm 148. In other embodiments, tamper sensor 136 may generate signals including data representing that an object is in close proximity to vaporized aerosol detection system 100, movement of vaporized aerosol detection system 100, integrity of housing 152, or any combination thereof. Tamper sensor 136 may be electronically and/or communicatively coupled to electronics stack 140 and configured to provide said signals to electronics stack 140. In embodiments, electronics stack 140 can be configured to detect that a tampering event has occurred based upon the received signals including data representing that an object is in close proximity to vaporized aerosol detection system 100, movement of vaporized aerosol detection system 100, integrity of housing 152, or any combination thereof. Electronics stack 140 may be configured to generate a tamper alarm when a tampering event has occurred. A user may enable, disable, or otherwise manipulate the tamper alarm from a user device and/or server 156 A-C. Tamper alarm may also be disabled through, for example, an interlock such as a magnetic switch disposed in or on housing 152, which may be engaged, for example, by a magnetic key fob held by a potential maintainer or user.

In embodiments, at least a portion of motion sensor 116, sensor suite 160, tamper sensor 136, electronics stack 140, battery 144, alarm 148, or any combination thereof, can be enclosed or encased with housing 152. Housing 152 may comprise a shape having a number of sides or faces which each side comprising opposite, opposing surfaces with a thickness between them. According to embodiments, a first surface of a side can form a portion of an outer wall of housing 152 and a second, opposing and opposite surface of the side can form a portion of an inner wall of housing 152. For example, in the illustrated embodiment of claim 1, housing 152 comprises a hollow three-dimensional prism with an outer mold line with a thickness. In embodiments, housing 152 may be one continuous shape or may be mechanically fastened smaller individual pieces configured to encase or enclose at least a portion of motion sensor 116, sensor suite 160, tamper senor 136, electronics stack 140, battery 144, alarm 148, or any combination thereof.

According to embodiments, housing 152 may be configured to snap together non permanently such that housing 152 may be pulled apart by a user for allowed access to interior components. Housing 152 may comprise injection molded plastics like high-density polyethylene (HDPE) or Acrylonitrile butadiene styrene (ABS), stamped or otherwise machined metal like aluminum, steel alloys, tin, or other alloys. Housing 152 may comprise a back plate which can be permanently or temporarily mechanically fastened to a cover through screws, nails, snap connectors, epoxy, glue, double-sided tape, rivets, or another undisclosed method alone or in combination. In embodiments, housing 152 may, in a hollow space within, enclose or encase at least a portion of motion sensor 116, sensor suite 160 (including particle sensor 120, chemical sensor 124, temperature sensor 128, humidity sensor 132, or any combination thereof), alarm 148, battery 144, electronics stack 140, tamper sensor 136 or a portion of any which may allow its optimal operation. Housing 152 may comprise cut-throughs and openings where a sensor may need access to an air sample of environment 104 or where a vaporized aerosol may enter housing to reach any internal component.

In embodiments, vaporized aerosol detection system 100 may include a display such as, for example, a light-emitting diode (LED) display, liquid crystal display (LCD), electronic ink display, cathode ray tube (CRT) display, organic LED display, or any combination thereof. According to embodiments, the display can be configured to display one or more alerts, measures and/or levels detected by sensor suit 160, battery level (especially low battery), a temperature of environment 104, a humidity of environment 104, general health information, or any combination thereof.

According to embodiments, motion sensor 116 can include one or more cameras communicatively coupled to electronics stack 140 and/or servers 156 A-C. These cameras may include, for example, video cameras, still cameras, SLR cameras, DSLR camera, closed circuit networks, or any combination thereof, to name a few. In embodiments, electronics stack 140 can be configured to provide power from battery 144 to a camera of motion sensor 116 when a detection event is detected. In response to being provided power and/or when a detection event is detected, a camera of motion sensor 116 can be configured to capture one or more images of environment 104, such as photographs and/or video footage of environment 104.

In embodiments, the captured videos and/or photographs (i.e., images) may be provided to electronics stack 140 and/or servers 156 A-C. According to embodiments electronics stack 140 and/or servers 156 A-C can each, or in tandem, be configured to analyze, process, and compress the captured video and/or photographs. For example, electronics stack 140 and/or servers 156 A-C can include facial recognition software configured to identify persons present in the captured videos and/or photographs. Further, electronics stack 140 and/or servers 156 A-C can be communicatively coupled with an organizational identification database for the purposes of facial recognition. In embodiments, analyzing the captured video and/or photographs may occur in real-time or may be delayed.

Figure 2A:
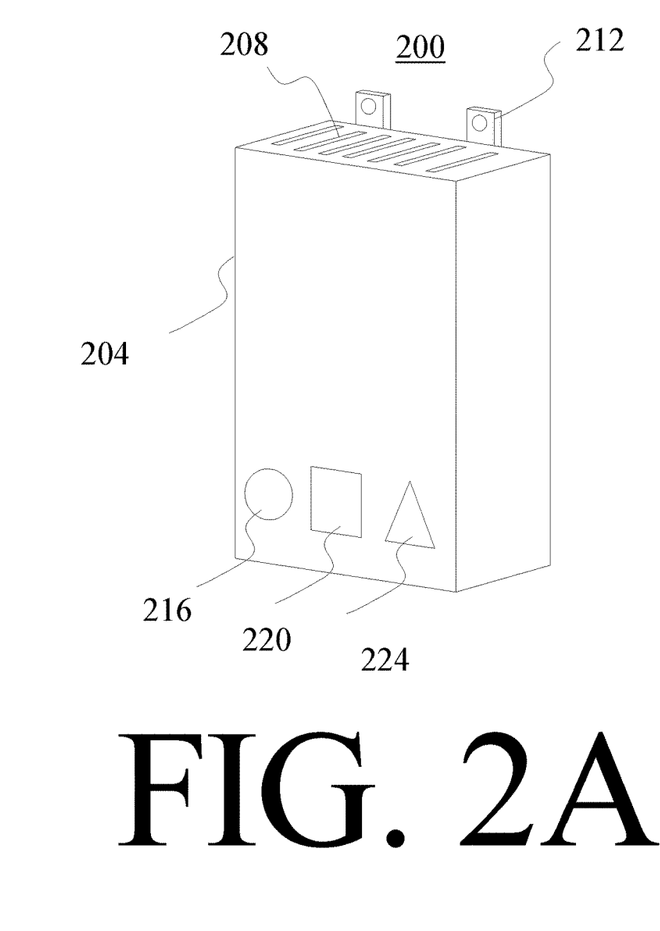
FIG. 2A is an isometric view illustrating a housing for a vaporized aerosol detection system, according to embodiments.

With reference to FIG. 2A, an isometric view of vaporized aerosol detection system 200, the similar or the same as vaporized aerosol detection system 100, is illustrated, according to embodiments. Vaporized aerosol detection system 200 can include motion sensor 216, sensor suite 240 (including particle sensor 220, chemical sensor 224, temperature sensor (not shown for clarity), humidity sensor (not shown for clarity), or any combination thereof), alarm 232, battery 228, electronics stack 236, tamper sensor (not shown for clarity), similar or the same as components hereinbefore described with reference to FIG. 1.

In embodiments, device housing 204, similar or the same as housing 152, is configured to enclose at least a portion of motion sensor 216, sensor suite 240 (including particle sensor 220, chemical sensor 224, temperature sensor (not shown for clarity), humidity sensor (not shown for clarity), or any combination thereof), alarm 232, battery 228, electronics stack 236, tamper sensor, and has a shape with at least one set of opposite, opposing surfaces. The shape of housing 204 can include any three-dimensional shape having one or more faces. In embodiments, the shape of housing 204 is hollow allowing housing 204 to enclose at least a portion of motion sensor 216, sensor suite 240 (including particle sensor 220, chemical sensor 224, temperature sensor, humidity sensor, or any combination thereof), alarm 232, battery 228, electronics stack 236, and/or tamper sensor. For example, in the illustrated embodiment of FIGS. 2A and 2B, housing 204 has the shape of a rectangular prism or a hollow box. According to embodiments, each face of the shape of housing 204 forms a respective wall of housing 204. A wall comprises a piece of material having opposite, opposing surfaces (e.g., an inner surface and an outer surface) with a thickness between them.

According to embodiments, a wall of housing 204 may comprise venting 208 which allows for air to travel within housing 204. Venting 208 may be accomplished by any number or combination of methods including, but not limited to slotting, screens, perforations, cutouts, pass throughs, milled holes, or injection-molded openings, to name a few. By allowing air to travel within housing 204, vaporized aerosol containing chemical particles may be provided to the sensors enclosed with housing 204 for sampling. Venting 208 may be disposed on any or all walls of housing 204 to allow for directed airflow.

In embodiments, housing 152 may be configured to enclose or encase one or more fans. Each fan may be disposed within housing 152 such that the fan is configured to draw air into venting 208 and/or push air out of venting 208. In embodiments, the fans enclosed within housing 152 may be configured to create a positive or negative pressure within housing 152 such that air is pulled into and/or forced out of venting 208. According to embodiments, creating a negative or positive pressure within device housing 152 may allow for air to travel within housing 152 so that it may be sampled by the sensors enclosed within housing 204. In embodiments, power may be provided to the fans from battery.

According to embodiments, housing 204 may comprise a flapper that allows air to pass through venting 208 such as during sampling but does not allow high pressure bursts of air to enter the system. In other words, the flapper can be configured to allow a low flow sampling (such as, for example <1 m/s airflow) while preventing higher flow rates or bursts (such as, for example, >1 m/s airflow). The flapper may be disposed near venting 208 and configured so that a sudden burst of air may force the flapper closed over at least a portion of venting 208 in order to protect the components enclosed within housing 204 from damage. The flapper may be made of mylar, aluminum, various plastics, or another undisclosed combination of lightweight materials. The closure of the flapper may be communicated wirelessly or through a wired connection to electronics stack 140 and/or servers 156 A-C for the purpose of notifying a user that sampling is taking place or the possibility that tampering was detected, for example. The flapper, in embodiments may have an electrical connection-type sensor that can determine if the flapper is closed by the presence of a completed circuit within the sensor, this is merely an example as any contact sensor or grouping of sensors may accomplish this task.

For example, air may enter housing 204 and travel over the enclosed particle sensor 216 and chemical sensor 220 laminarly so that particle sensor 216 and chemical sensor 220 may sample the air. Laminar flow is defined as non-turbulent flow with smooth streamlines and little to no mixing of layers of flowing particles. According to embodiments, the arrangement of the particle sensor 220, chemical sensor 224, and any other sensors that may be present alone or in combination fully and/or partially enclosed within housing 204 may be sequential such that airflow is sampled by sensors in the order in which the sensors are reached by the airflow.

According to embodiments, housing 204 may comprise mounting hardware 212 for mounting the device in a plurality of orientations and in a plurality of locations. Mounting hardware 212 may comprise threaded holes, clearance holes, hooks, slots, or other hardware interfaces that may accept or interact with standard hardware for mounting in a plurality of arrangements and orientations. In the exemplary embodiment FIG. 2A mounting hardware 212 is arranged for mounting on a wall of a room. This is only an example and one of ordinary skill in the art would understand mounting hardware 212 may take another form for mounting the device on a ceiling or in a vehicle.

According to embodiments, housing 204 and enclosed components may also be configured in line with an air filtration system, a vehicle air system, an HVAC system, an air conditioning system, or any system which passes air and/or gaseous fluid through it. In embodiments, vaporized aerosol detection system 200 may be configured to be only a subcomponent or process in a larger system such that it may detect information about a detection event and convey that to a larger system. These systems, both system 200 and the larger HVAC type system, may be disposed in or on residential or commercial buildings, vehicles like airplanes, cars, and/or trucks, or any combination thereof, to name a few. Housing 204 may also comprise a screen configured to provide general information about the system, warnings or alerts, and/or health-related information configurable by a user or as reflected by sensor data from the system.

Figure 2B:
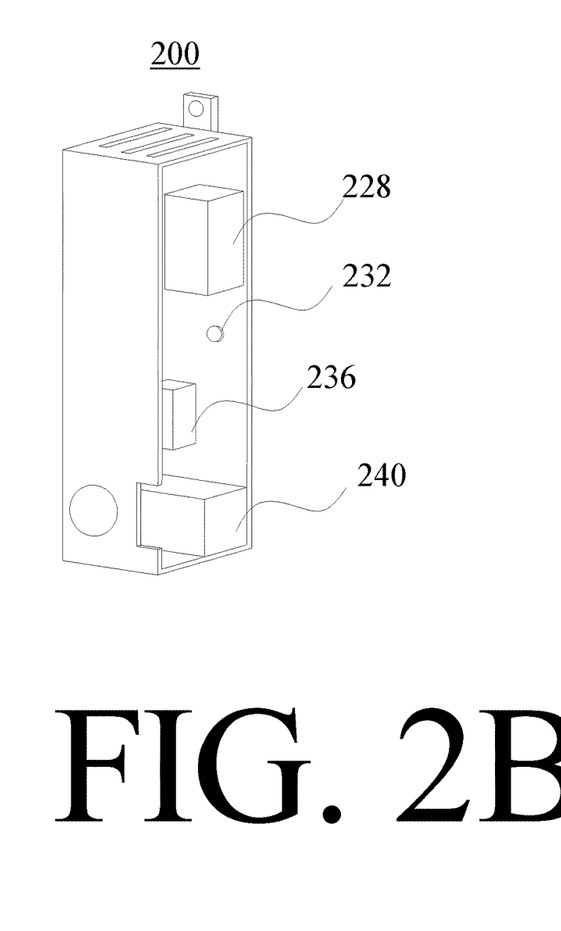
FIG. 2B is an isometric cutaway view illustrating a housing for a vaporized aerosol detection system, according to embodiments.

With reference to FIG. 2B an isometric cutaway view of device from FIG. 2A is shown. The disposition of previously shown sensors 216, 220, 224, may alternatively be found within or on the device as well. In FIG. 2B electronics stack 236 is shown along with battery 228 and alarm 232. One of ordinary skill in the art would understand that the arrangement of components within housing 204 are example embodiments and in other embodiments may take different forms allowing for different shaped housings, airflow directions, mounting arrangements, and environmental locations.

Figure 3:
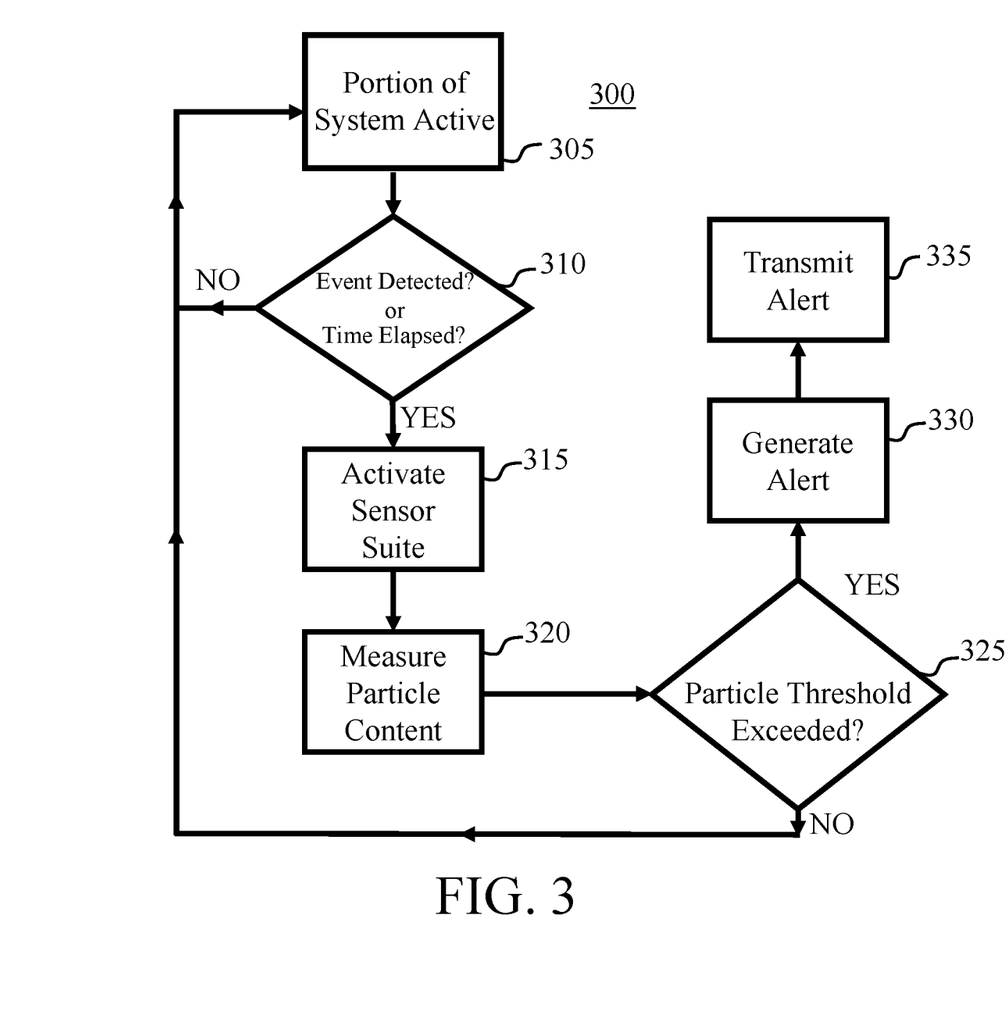
FIG. 3 is a flow chart illustrating a method for vaporized aerosol detection, according to embodiments.

With reference to FIG. 3 a flow chart illustrating a method for vaporized aerosol detection 300 is presented. At 305, a motion sensor, particle sensor, chemical sensor, and/or real time clock similar or the same as motion sensor 116, particle sensor 120, or chemical sensor 124, respectively, may be active. According to an embodiment, at 310, the motion sensor can be configured to determine whether motion has been detected by detecting the motion, proximity, and/or presence of one or more objects within an area. In embodiments, detecting whether motion has been detected in an environment can include comparing a detected motion, proximity, presence, size, speed, or any combination thereof to a threshold value. In this way, certain types of motion (such as from small animals) may be filtered out while other types of motion (such as from a person walking) will be detected. In another embodiment, a similar methodology may be followed with a chemical sensor similar to or the same as chemical sensor 124. The chemical sensor may additionally or alternatively be powered on and upon detection of a substance of interest, may provide similar signals as motion sensor 116 configured to power the system as described below. In yet another example embodiment, a similar methodology may be followed with a particle sensor similar to or the same as particle sensor 120. The particle sensor may additionally or alternatively be powered on, and upon detection of a substance of interest, may provide similar signals as motion sensor 116 or chemical sensor 124 configured to power the system as described below. Additionally, or alternatively, a real time clock, which keeps track of time, may be used as a timer to power system on and off at predetermined times or intervals.

Further, at 310, if motion has been detected, particles have been detected, chemicals have been detected, and/or a predetermined time has elapsed or arrived then the system moves on to 315, otherwise 305 is repeated. At 315, a portion of the system, which may correspond to at least a portion of a sensor suite similar or the same as sensor suite 160 is activated. Step 315 may comprise powering a portion of the sensor suite and arming constituent sensors. The arming of sensors at step 315 may also command those sensors to begin taking measurements. The arming of sensors is irrespective of readings of any sensors, in other words, if motion is detected at step 310, the sensor suite may start taking measurements with or without the presence of vaporized aerosols.

At 320, a particle count of the environment is measured by the sensor suite. The sensor suite is configured to detect the quantity, size, density, composition, structure, dispersion, or any combination thereof, of aerosolized particles in vaporized aerosol in a certain area similar or the same as environment 104. In embodiments, the sensor suite is configured to generate one or more signals including data representing the quantity, size, density, composition, structure, dispersion, or any combination thereof of the aerosolized particles. According to embodiments, these signals may be sent to an electronics stack, the same as or similar to, electronics stack 140. At 325, the system is configured to determine whether a detection event has occurred. Determining whether a detection event has occurred can comprise determining the presence of substances of interest in the area. Substances of interest can include any substances that may be a cause of concern for the area. For example, substances of interest can include substances that are disallowed in the area (such as nicotine, cannabinoids, tetrahydrocannabinoids, tobacco smoke, etc.), particles that are hazardous (carbon monoxide, arsine, hydrogen azide, hydrogen cyanide, nitrogen dioxide, viruses, bacteria, pathogens, etc.), undesirable particles for the area (tobacco smoke, nicotine, cannabinoids, tetrahydrocannabinoids, ammonia from pet excrement, etc.), or any combination thereof, to name a few. According to embodiments, determining the presence of substances of interest can include comparing, respectively by an electronics stack and/or at least a server, a detected size, structure, composition, density, and/or dispersion to a threshold value. For example, a detected size exceeding a threshold value may indicate that substances of interest are present in the area.

Further, at 325, the system is configured to compare the quantity, particle density, and/or dispersion of detected substances of interest to one or more predetermined threshold values in order to determine if a detection event has occurred. For example, the system may be configured to compare a detected particle density (such as from a cloud of aerosolized vape) to a threshold value and determine that the particle density has exceeded the threshold value indicating a detection event has occurred. If a detection event has occurred then the system moves to 330, otherwise the system repeats step 305.

At 330, an alarm signal is generated. The alarm signal can comprise a signal configured to induce an alert from an alarm similar or the same as alarm 148. The alert can include an auditory alert or signal (such as a buzzer, siren, horn, etc.), a visual alert or signal (such as an LED, strobe light, laser, LED screen, LCD screen, etc.), tactile alert or signal (such as a vibration alarm, motor, etc.), or any combination thereof.

At 335, the alarm signal can be transmitted to one or more servers the same or similar as server 156 A-C or a user device and additionally stored. The alarm signal can include data indicating that a detection event has occurred in the area and can be configured to display a particle count, density, size, composition, etc. as well as the area in which the detection event occurred on the user device. A user device may comprise a computer, a processor, a server, a smartphone, a tablet, a laptop, or any combination thereof, to name a few. In embodiments, a user may disable the alarm from a user device, whether that alarm was triggered by a detection event or a tamper event.

Figure 4:
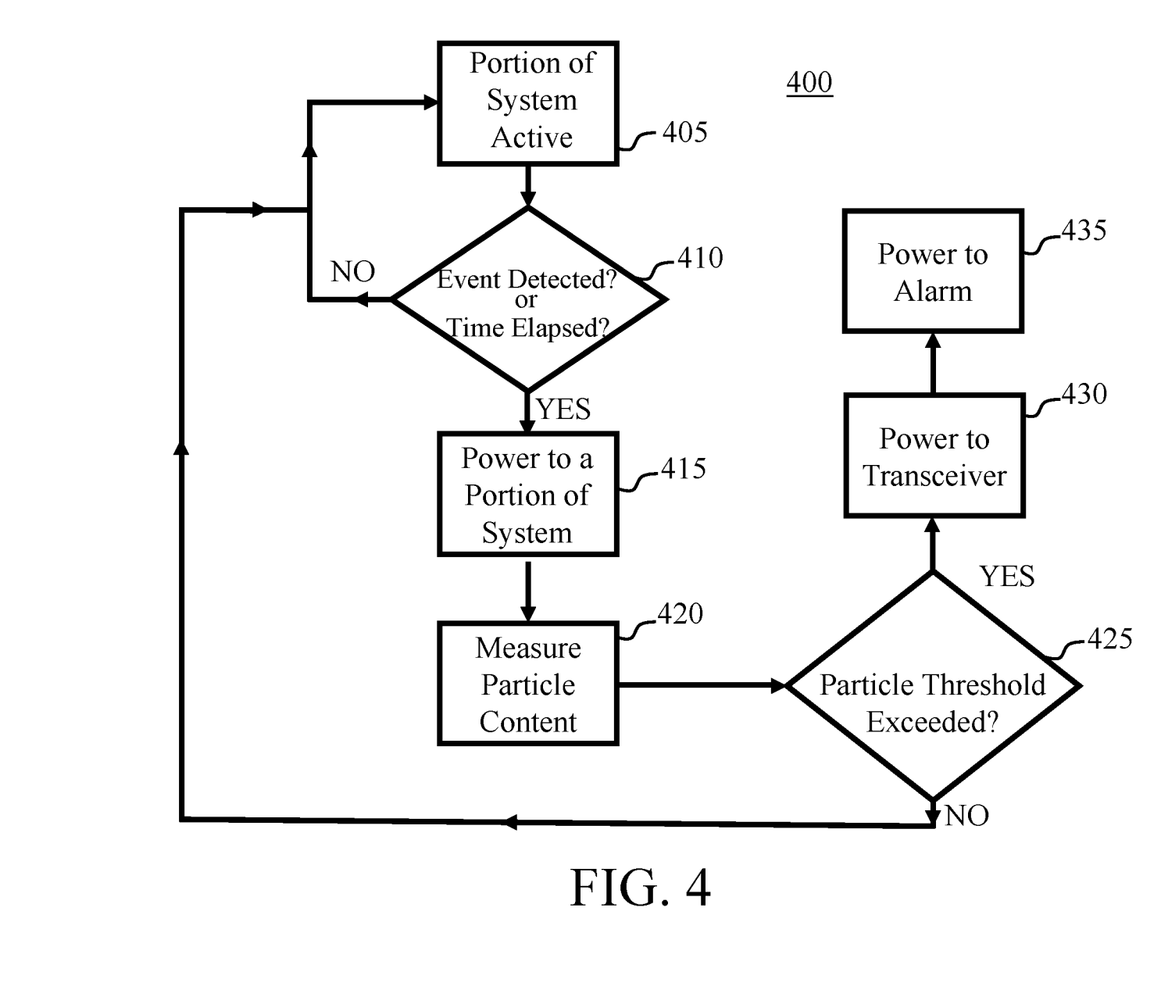
FIG. 4 is a flow chart illustrating a method of power management of a vaporized aerosol detection system, according to embodiments.

With reference to FIG. 4, a flow chart illustrating a method for power distribution in a vaporized aerosol detection system 400 is presented. At 405, a motion sensor, particle sensor, chemical sensor, or the like, which may be similar or the same as motion sensor 116, particle sensor 120, or chemical sensor 124, respectively, may be active. At 410, the motion sensor can be configured to determine whether motion has been detected by detecting the motion, proximity, and/or presence of one or more objects within an area. Additionally, or alternatively, at 410, the particle sensor or chemical sensor may be configured to determine if vaporized aerosols and/or chemicals are present within an area. In embodiments, detecting whether motion has been detected in an environment can include comparing a detected motion, proximity, presence, size, speed, or any combination thereof to a threshold value. In this way, certain types of motion (such as from small animals) may be filtered out while other types of motion (such as from a person walking) will be detected. In another example embodiment, a similar methodology may be followed with a chemical sensor similar to or the same as chemical sensor 124. The chemical sensor may be powered on, and upon detection of a substance of interest, may provide similar signals as motion sensor 116 configured to power the system as described below. In yet another example embodiment, a similar methodology may be followed with a particle sensor similar to or the same as particle sensor 120. The particle sensor may additionally or alternatively be powered on, and upon detection of a substance of interest, may provide similar signals as motion sensor 116 or chemical sensor 124 configured to power the system as described below. Additionally, or alternatively, a real time clock, which keeps track of time, may be used as a timer to power system on and off at predetermined times or intervals.

Further, at 410, and in separate or the same example embodiments, if motion has been detected, particles have been detected, chemicals have been detected, and/or a predetermined time has elapsed or arrived then the system moves on to 415, otherwise 405 is repeated. At 415, a portion of the system is activated, this may correspond to a sensor suite similar or the same as sensor suite 160. In embodiments, activating a portion of the system, such as the sensor suite, can comprise providing power to one or more sensors within the sensor suite from a battery the similar or the same or battery 144. In embodiments, power from battery 144 can be controlled and directed by electronics stack the same or similar as electronics stack 140. Electronics stack 140 can be configured to provide power to one or more sensors of the sensor suite when motion, particles, chemicals, or in general, substances of interest have been detected in the area. Further, in embodiments, the electronics stack 140 can be configured to provide power from battery 140 to one or more components of electronics stack 140 in response to motion being detected in the area.

In an embodiment, at 420, a particle count of the environment is measured by the powered sensors within the sensor suite. The powered sensors can be configured to detect the quantity, size, density, composition, structure, dispersion, or any combination thereof, of aerosolized particles in vaporized aerosol in a certain area similar or the same as environment 104. In embodiments, the powered sensors are configured to generate one or more signals including data representing the quantity, size, density, composition, structure, dispersion, or any combination thereof of the aerosolized particles. According to embodiments, these signals may be sent to the electronics stack.

At 425, the system is configured to determine whether a detection event has occurred. Determining whether a detection event has occurred can comprise determining the presence of substances of interest in the area. Substances of interest can include any particles that may be a cause of concern in the area. For example, substances of interest can include particles that are disallowed in the area (such as nicotine, cannabinoids, tetrahydrocannabinoids, tobacco smoke, etc.), particles that are hazardous (carbon monoxide, arsine, hydrogen azide, hydrogen cyanide, nitrogen dioxide, viruses, bacteria, pathogens, etc.), undesirable particles for the area (tobacco smoke, nicotine, cannabinoids, tetrahydrocannabinoids, ammonia from pet excrement, etc.), or any combination thereof, to name a few. According to embodiments, determining the presence of substances of interest can include comparing, respectively by an electronics stack and/or at least a server, a detected size, structure, composition, density, and/or dispersion to a threshold value. For example, a detected size exceeding a threshold value may indicate that substances of interest are present in the area.

Further, at 425, the system is configured to compare the quantity, particle density, and/or dispersion of detected substances of interest to one or more predetermined threshold values in order to determine if a detection event has occurred. For example, the system may be configured to compare a detected particle density of carbon monoxide to a threshold value and determine that the particle density has exceeded the threshold value indicating a detection event has occurred. If a detection event has occurred then the system moves to 430, otherwise the system may cease providing power to the sensors and the system repeats step 405.

At step 430, power is provided from the battery to a transceiver within the electronics stack. The transceiver can be configured to transmit and/or receive data from one or more servers the same or similar to servers 156 A-C and/or a user device via, for example, internet, cellular networks, WIFI, Bluetooth, ZigBee, ethernet, wired connections, or any combination thereof. A user device may comprise a computer, a processor, a server, a smartphone, a tablet, a laptop, or any combination thereof, to name a few.

At step 435, power is provided from the battery to an alarm the same or similar as alarm 148. In embodiments, alarm 148 is configured to generate an alert or signal when power is provided and/or an alarm signal is received. Such an alert can include, but is not limited to, an audible alert or signal (such as a buzzer, siren, horn, etc.), a visual alert or signal (such as an LED, strobe light, laser, LED screen, LCD screen, etc.), tactile alert or signal (such as a vibration alarm, motor, etc.), or any combination thereof.

Figure 5:
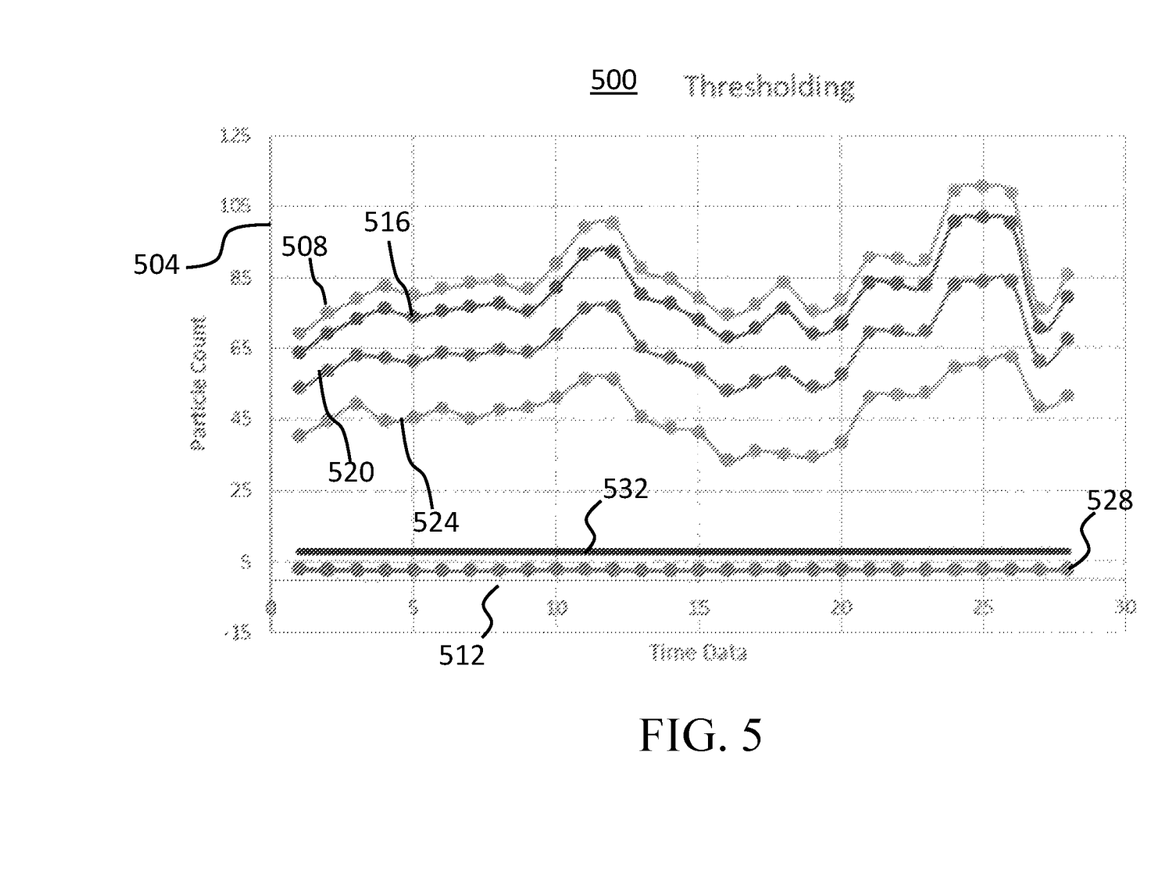
FIG. 5 is a graph representing example graphical thresholding values, according to an example embodiment.

Referring now to FIG. 5, a graph 500 representing example sensor signals 508, 516, 520, 524, and 528 and an example threshold 532 over particle count 504 vs time 512 is presented, according to an example embodiment. Graph 500 demonstrates an example particle count threshold that, when exceeded, may trigger an alarm and/or alert. According to graph 500, it can be seen that sensor signals 508, 516, 520, 524, and exceed threshold 532. Conversely, sensor signal line 528 does not exceed threshold 532 and would therefore not trigger an alarm and/or an alert due to a detection event that has occurred.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
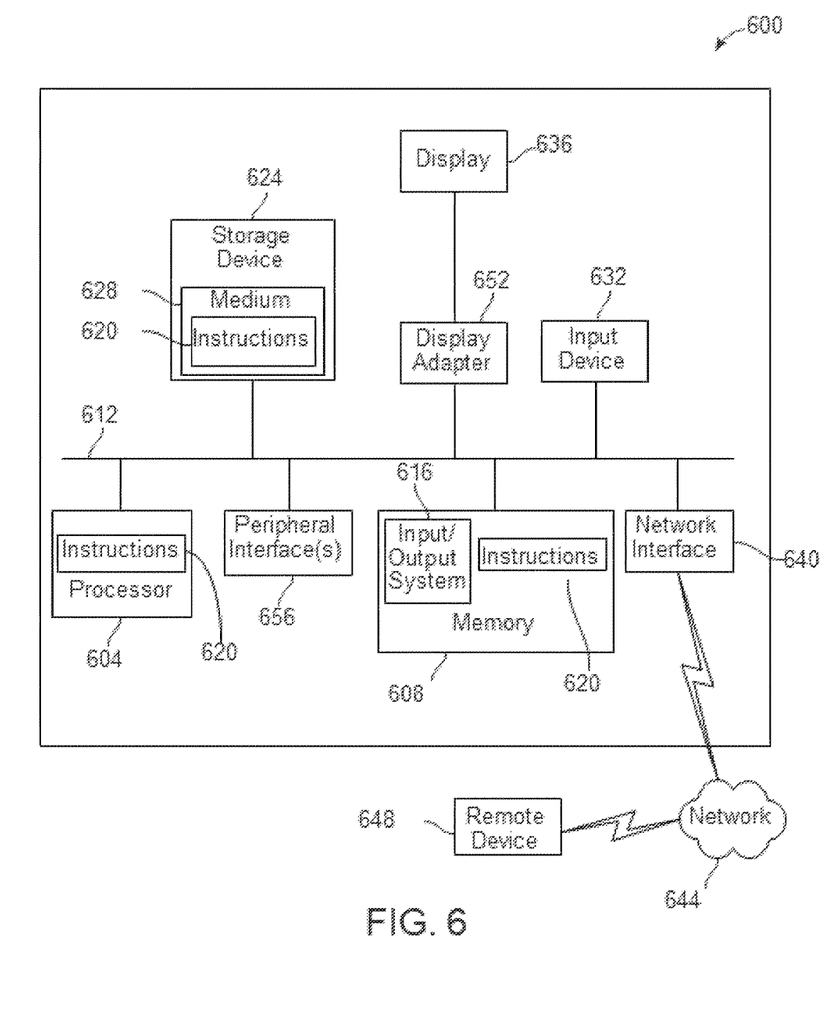
FIG. 6 is a block diagram illustrating a computing device in the example form of a computer system, according to embodiments.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Processor 604 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 604 may be organized according to Von Neumann and/or Harvard architecture as a non-limiting example. Processor 604 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC)

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 344, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An air quality detection system, comprising:
   a motion sensor configured to detect a movement of an object in an environment;
   a sensor suite including a particle sensor configured to detect a particle count of a substance in air of the environment;
   an electronics stack configured to control power to the sensor suite; and
   a housing configured to enclose at least a portion of the motion sensor, the sensor suite, and the electronics stack;
   wherein, in response to the movement of the object indicating the object has entered the environment, the electronics stack is further configured to change the particle sensor from a powered-off state to a powered-on state.

2. The system of claim 1, wherein the electronics stack is further configured to:
   compare the movement of the object in the environment to a movement threshold; and
   determine the object has entered the environment based on the comparison.

3. The system of claim 1, wherein the electronics stack is further configured to:
   transmit a signal representing the movement of the object in the environment to a server; and
   receive, from the server, a detection signal indicating the object has entered the environment.

4. The system of claim 1, wherein the sensor suite further includes a chemical sensor configured to detect a presence of the substance in air of the environment.

5. The system of claim 4, wherein the electronics stack is further configured to:
   in response to the chemical sensor detecting the presence of the substance in air of the environment, change the particle sensor from the powered-off state to the powered-on state.

6. The system of claim 1, wherein the electronics stack is further configured to:
   compare the particle count of the substance in air of the environment to a threshold value.

7. The system of claim 1, further comprising an audible alarm, wherein the electronics stack is further configured to, in response to the particle count of the substance in air of the environment exceeding a threshold value, power on the audible alarm.

8. The system of claim 1, wherein the particle sensor is configured to detect the particle count of a virus in air of the environment.

9. The system of claim 1, wherein the electronics stack is configured to control power from a battery.

10. The system of claim 1, further comprising:
    detecting, by the particle sensor, a particle count of a virus in the environment when the particle sensor is in a powered-on state.

11. A method for air quality detection, comprising:

detecting, by a motion sensor, a movement of an object in an environment;

in response to the movement of the object indicating the object has entered the environment, changing a particle sensor from a powered-off state to a powered-on state; and detecting, by the particle sensor, a particle count of a substance in air of the environment when the particle sensor is in a powered-on state, wherein at least a portion of the motion sensor and at least a portion of the particle sensor are disposed in a housing.

12. The method of claim 11, further comprising:

comparing the movement of the object in the environment to a movement threshold; and determining the object has entered the environment based on the comparison.

13. The method of claim 11, further comprising:

transmitting a signal representing the movement of the object in the environment to a server; and receiving, from the server, a detection signal indicating the object has entered the environment.

14. The method of claim 11, further comprising:

detecting a presence of the substance in air of the environment.

15. The method of claim 14, further comprising:

in response to the chemical sensor detecting the presence of the substance in air of the environment, changing the particle sensor from the powered-off state to the powered-on state.

16. The method of claim 11, further comprising:

comparing the particle count of the substance in air of the environment to a threshold value.

17. The method of claim 11, further comprising:

in response to the particle count of the substance in air of the environment exceeding a threshold value, powering on an audible alarm.

18. A system for air quality detection, comprising:

a sensor suite including a chemical sensor to detect a presence of a substance in air of an environment and a particle sensor to detect a particle count of the substance in air of the environment;

an electronics stack configured to, in response to the chemical sensor detecting the presence of the substance, switch the particle sensor from a powered-off state to a powered-on state; and a housing configured to enclose at least a portion of the sensor suite and the power controller.

19. The system of claim 18, wherein the substance comprises a virus.

20. The system of claim 18, wherein the electronics is configured to control power supplied by a battery disposed within the housing.

* * * * *